United States Patent [19]

Uchida et al.

[11] 4,024,725
[45] May 24, 1977

[54] CONTROL SYSTEM FOR AN AIR CONDITIONER

[75] Inventors: Motokazu Uchida, Tokyo; Taisei Hosoda; Hideo Uzuhashi, both of Tochigi; Kohji Kamejima, Kokubunji; Minoru Kano, Higashimurayama, all of Japan

[73] Assignee: Hitachi, Ltd., Japan

[22] Filed: May 28, 1975

[21] Appl. No.: 581,710

[30] Foreign Application Priority Data

May 29, 1974 Japan .............................. 49-59689

[52] U.S. Cl. .............................. 62/176 E; 62/209; 236/91 G
[51] Int. Cl.² ........................................ G05D 23/24
[58] Field of Search ......... 236/68 B, 3, 91 E, 91 G, 236/91 R; 62/176 E, 209; 219/499, 497

[56] References Cited

UNITED STATES PATENTS

| 2,012,285 | 8/1935 | Otis | 236/91 R |
| 2,053,492 | 9/1936 | Otto | 236/1 |
| 2,556,065 | 6/1951 | Callender | 219/499 |
| 2,686,043 | 8/1954 | Smith et al. | 236/68 B |

*Primary Examiner*—William E. Wayner
*Attorney, Agent, or Firm*—Craig & Antonelli

[57] ABSTRACT

A control system for an air conditioner having detectors for detecting at least the radiation temperature in a room or controlled space, a device for setting a desired room air parameter in response to the detected radiation temperature, and a controller for controlling the air conditioner in accordance with the desired room air parameter.

16 Claims, 15 Drawing Figures

CONTROL SYSTEM FOR AN AIR CONDITIONER

BACKGROUND OF THE INVENTION

The present invention relates to a control system for an air conditioner, in particular, to a system for controlling parameters such as room air temperature, air flow velocity, relative humidity, etc.

In a prior art air conditioner, the room air temperature is controlled using a temperature controller set at a predetermined level and detecting the actual room air temperature. In general, the air conditioner is designed so as to hold the room air temperature at a predetermined level when the thermal load is maximum at midsummer. Furthermore, occupants of the room or controlled space must change the set point of the temperature controller when the mean skin temperature, the temperature which occupants feel, varies because of variations of external conditions. The mean skin temperature determines the thermal comfort condition.

It is known that the mean skin temperature is related to the room air temperature, the relative humidity and the air flow velocity as well as to the radiation temperature in a room space. Thus, if the room air temperature is set for a thermal comfort condition at the maximum thermal load, that is, a high radiation temperature, occupants feel colder when the radiation temperature becomes lower in the evening or at night. Accordingly, residents must operate a temperature control dial to change the room air temperature in the evening or at night.

If they do not operate the dial, they feel uncomfortable. The mean skin temperature is also influenced by the air flow velocity and the relative humidity in a room.

The air flow velocity and the relative humidity can also be changed in response to any changes in the radiation temperature. Furthermore, in the prior art air conditioner, unnecessary power is consumed by keeping the room air temperature unduly low even when the radiation temperature becomes low.

SUMMARY OF THE INVENTION

An object of the present invention is to provide a control system for an air conditioner which always keeps the room climate comfortable.

Another object of the present invention is to provide a control system for an air conditioner which remarkably reduces power consumption.

In order to achieve these obects, the present invention is characterized by providing a control system for an air conditioner including, means for detecting the air temperature and the radiation temperature in a controlled space, means for setting a predetermined air temperature for controlling the air conditioner in response to the radiation temperature, and means for controlling the air conditioner in response to the difference between the predetermined air temperature and the actual air temperature.

These and other objects, features and changes of the present invention will become more apparent from the following description when taken in connection with the accompanying drawings, which shows, for purposes of illustration only, several embodiments in accordance with the present invention, and wherein:

DETAILED DESCRIPTION OF THE INVENTION

Though there are many variable parameters as mentioned above, in order to hold the mean skin temperature at a predetermined level in order for occupants of a room to be comfortable even when the radiation temperature varies, the following explanation is first directed to the method for controlling the room air temperature.

Figure 1:
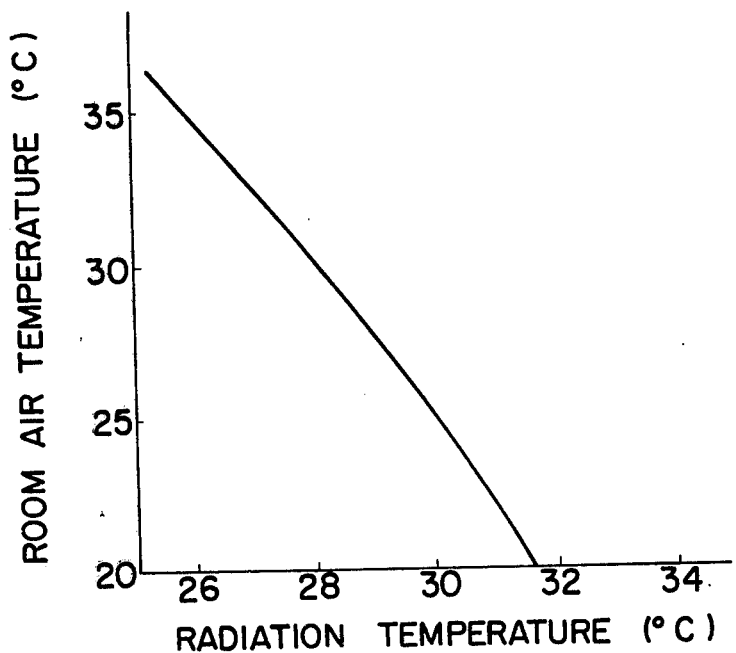
FIG. 1 is a characteristic diagram showing the relation between the radiation temperature and the room air temperature necessary to provide condition of thermal comfort by keeping the mean skin temperature constant.

FIG. 1 is a characteristic diagram showing experimentally obtained values for the relation between the radiation temperature and the room air temperature used to hold the mean skin temperature at a predetermined value in order for occupants to be comfortable under any conditions.

From FIG. 1, it can be seen that occupants feel comfortable at an air temperature of 25° C. when the radiation temperature is 30° C. However, when the radiation temperature falls to 29° C., the room air temperature must be raised to 28° C. to hold the mean skin temperature at the constant value so as to maintain the same condition of thermal comfort. Therefore, the control system according to the present invention is characterized by providing a control such that the room air temperature falls with the rising of the radiation temperature, and the room air temperature rises with the falling of the radiation temperature.

The characteristic curve in FIG. 1 can be changed according to the relative humidity, or the clothing condition, or the activity level of the occupants. In short, the fundamental principle of this invention is to change the room air temperature in inverse proportion to the radiation temperature. Therefore, the control system according to this invention can always provide a room with a predetermined thermal comfort condition without manually controlling the temperature setting device both in the daytime and at night. Furthermore, this control system can reduce power consumption because the air conditioner is not operated so as to hold the room air temperature at an unduly low temperature.

The present invention is applicable to air conditioners which control the room air temperature through the intermittent operation of the compressor for compressing the coolant, as well as to air conditioners which control the room air temperature by the continuous variation of the rotating speed of the compressor. This invention is further applicable to air conditioners which control the room air temperature by other devices in addition to the above-mentioned devices.

The following explanation is directed to an arrangement for controlling the room air temperature. In order to detect the radiation temperature, a globe thermometer, or other well known mechanical and electronic radiation sensing devices can be used in this invention. The most advantageous type of device for this invention is a thermistor, a resistance thermometer, or a thermocouple, etc. which indicates the temperature as an electrical signal.

Figure 2:
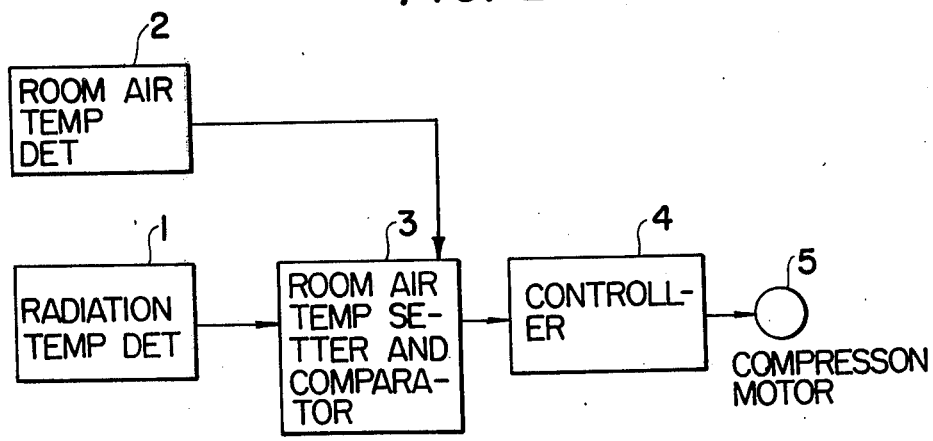
FIG. 2 is a block diagram showing one embodiment of the control system according to the present invention.

FIG. 2 shows the fundamental construction of a control system according to the present invention. In FIG. 2, 1 represents a radiation temperature detector, 2 a room air temperature detector, 3 a device including a room air temperature setter and a comparator, 4 a controller for controlling the compressor motor in the air conditioner and 5 a compressor motor.

A radiation temperature signal from the radiation temperature detector 1 is inputted or supplied to the room air temperature setter 3. In the setter portion of device 3, the set temperature is varied in response to the signal from detector 1 so as to maintain a relation as is shown in FIG. 1. The actual room air temperature signal from the room air temperature detector 2, is supplied into the comparator portion of device 3. In the comparator portion of device 3, the actual room air temperature signal is compared to the set temperature, thereby obtaining a difference signal therebetween. The compressor motor 5 is controlled by the controller 4 in response to the difference signal provided by device 3 so as to bring the actual room air temperature equal to the set temperature.

Figure 3:
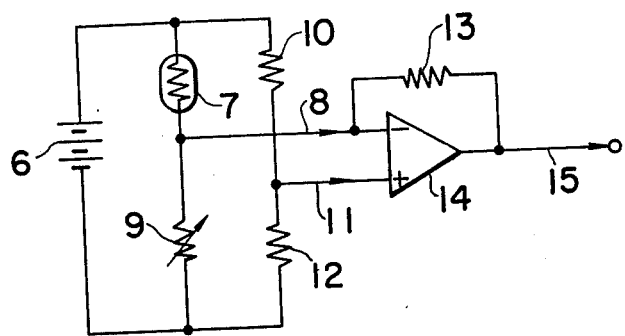
FIGS. 3 and 4 are circuit and characteristic diagrams, respectively, showing one embodiment of a portion of a control system according to the present invention.

Next, embodiments of the actual circuits of the temperature setter are shown. FIG. 3 shows one embodiment of the temperature setter in the control system according to the present invention. In FIG. 3, 6 represents a power source, 7 a radiation temperature detecting thermistor, 9 a variable resistor, 10, 12, and 13, fixed resistors, 14 a differential amplifier and 8, 11 and 15 signal lines. A bridge circuit including the thermistor 7, the variable resistor 9 and fixed resistors 10 and 12 is connected to both terminals of the power source 6. In the bridge circuit, a series circuit consisting of the thermistor 7 and the variable resistor 9 and a series circuit consisting fixed resistors 10 and 12 are connected in parallel to both terminals of the power source 6. Signal lines 8 and 11 are connected to a connection point between the thermistor 7 and resistor 9 and to a connection point between resistors 10 and 12, respectively. Signal lines 8 and 11 are also connected to the input terminals of the differential amplifier 14. The output terminal of the amplifier 14 is connected to signal line 15 and connected to signal line 8 through the fixed resistor 13.

In such a construction, when the radiation temperature in the room varies, the resistance of the thermistor 7 located in the room or in the air conditioner varies. The voltage on signal line 8 varies in response to such resistance variation. This voltage is compared with the voltage on signal line 11 in the amplifier 14. An output voltage corresponding to the set temperature is thereby obtained on signal line 15.

Figure 4:
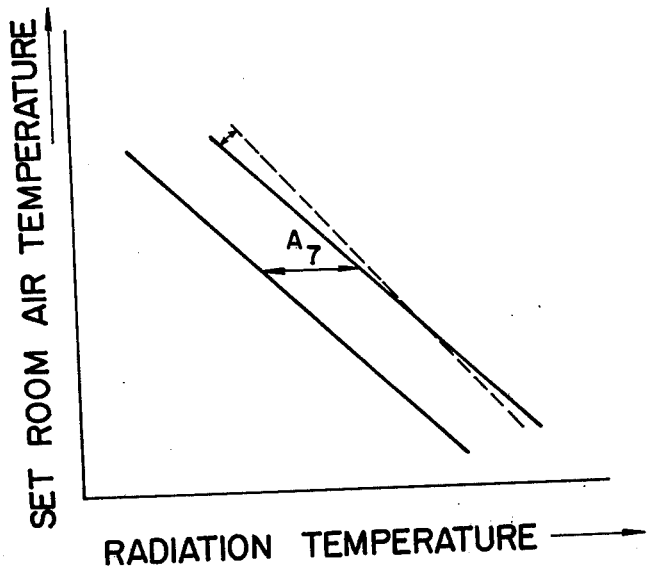

FIG. 4 shows the relation between the radiation temperature and the set temperature obtained from the circuit shown in FIG. 3. The characteristic curve shown by the solid lines in FIG. 4 can be moved as shown by the arrow A by adjustment of the variable resistor 9. Furthermore, the gradient of the characteristic curve can also be changed as shown by the dotted line by adjustment of resistor 13. The thermistor 7 can be replaced by two thermistors which compensate for the error of the radiation temperature caused by the room air temperature. Other detecting elements can also be used in lieu of the thermistor 7. Furthermore, it is possible to substitute a fixed resistor for the variable resistor 9 and to substitute a variable resistor for fixed resistors 10 and 12.

Figure 5:
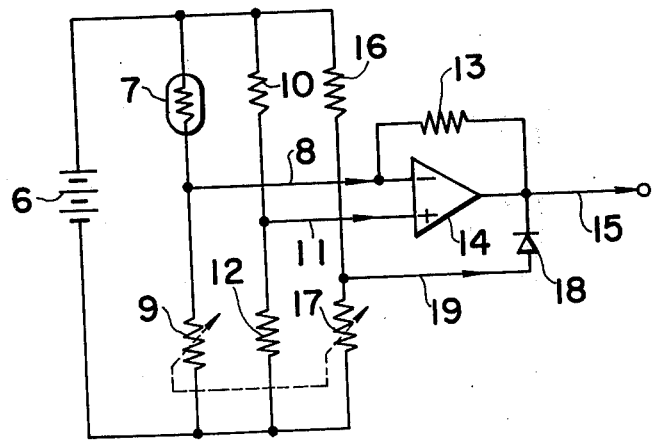
FIGS. 5 and 6 are circuit and characteristic diagrams, respectively, showing another embodiment of a portion of the control system according to the present invention.
Figure 6:
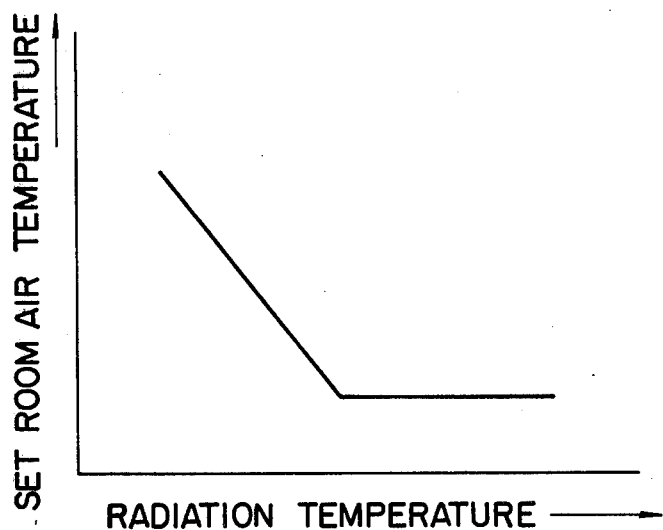

FIG. 5 shows another embodiment of the temperature setter according to the present invention and FIG. 6 shows a characteristic curve obtained from the setter shown in FIG. 5. In the case that the set temperature is set in response to the radiation temperature as shown in FIG. 3, the room air temperature sometimes becomes extremely low and differs extremely from the external temperature when the radiation temperature is very high in the daytime. Such a condition is unhealthy and power consumption becomes large. In the embodiment of FIG. 5, the lower value of the set temperature is set at a predetermined value so as to prevent the room air temperature from becoming less than the predetermined value.

In FIG 5, 16 represents a fixed resistor, 17 a variable resistor, 18 a diode and 19 a signal line. A series circuit of the fixed resistor 16 and the variable resistor 17 is connected to the terminals of the power source 6. Signal line 19 is connected to a connection point between resistors 16 and 17 and is connected to the anode of the diode 18, the cathode of which is connected to signal line 15. The lower value of the set temperature is determined by a circuit including resistors 16 and 17 and the diode 18.

When the voltage on signal line 15 becomes less than that on signal line 19, the voltage on signal line 15 is made equal to that on signal line 19 by conduction of the diode 18. Therefore, the lower value is determined by the adjustment of the variable resistor 17. As shown by the dotted line in FIG. 5, adjustment of resistor 17 can be executed together with adjustment of resistor 9. It is possible to substitute a fixed resistor for variable resistor 9 and to substitute a variable resistor for fixed resistor 10 or 12. Furthermore, it is possible to substitute a fixed resistor for variable resistor 17 and to substitute a variable resistor for fixed resistor 16.

Figure 7:
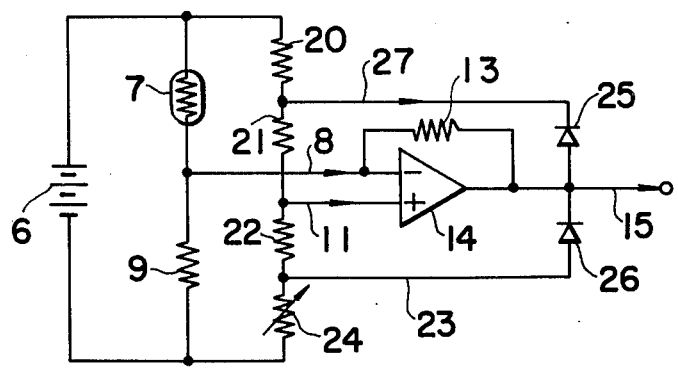
FIGS. 7 and 8 are circuit and characteristic diagrams, respectively, showing another embodiment of a portion of the control system according to the present invention.

FIG. 7 shows yet another embodiment of the temperature setter according to the present invention.

In order to prevent the room air temperature from becoming extremely high when the radiation temperature becomes low at night, the upper value of the set temperature is set at a predetermined level in the embodiment in FIG. 7 in addition to setting the lower value thereof as in FIG. 5.

Figure 8:
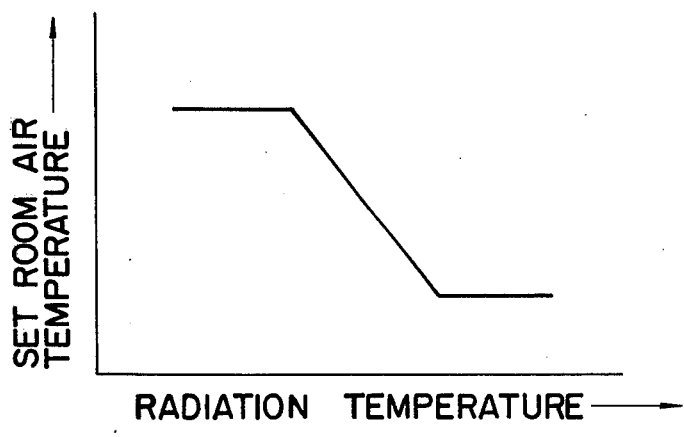

FIG. 8 shows a characteristic curve obtained from the circuit of FIG. 7. In FIG. 7, 20, 21 and 22 represent fixed resistors, 24 represents a variable resistor, 25 and 26 represent diodes and 23 and 27 represent signal lines. A series circuit of resistors 20, 21, 22 and 24 is connected to the terminals of the power source 6. Signal line 27 is connected to a connection point between resistors 20 and 21 and the cathode of diode 25. Signal line 23 is connected to a connection point between resistors 22 and 24 and the anode of diode 26. The anode of diode 25 and the cathode of diode 26 are connected in common to signal line 15.

In such a construction, when the voltage on signal line 15 becomes greater than the voltage on signal line 27, the voltage on signal line 15 is made equal to the voltage on signal line 27 by the conduction of diode 25. Since the voltage on signal line 15 can not exceed that on signal line 27, the upper value of the set temperature is set at a predetermined value as shown in FIG. 8.

On the other hand, when the voltage on signal line 15 becomes less than that on signal line 23, the voltage on signal line 15 is made equal to that on signal line 23 by the conduction of diode 26. Therefore, the lower value of the set temperature is set at a predetermined value. Determination of the upper and lower values of the set temperature and of the characteristic curve shown in FIG. 8 is achieved by adjustment of the variable resistor 24. In FIG. 7, a fixed resistor is used as resistor 9. It is possible to substitute a fixed resistor for the variable resistor 24 and to substitute a variable resistor for the fixed resistor 20, 21 or 22.

Figure 9:
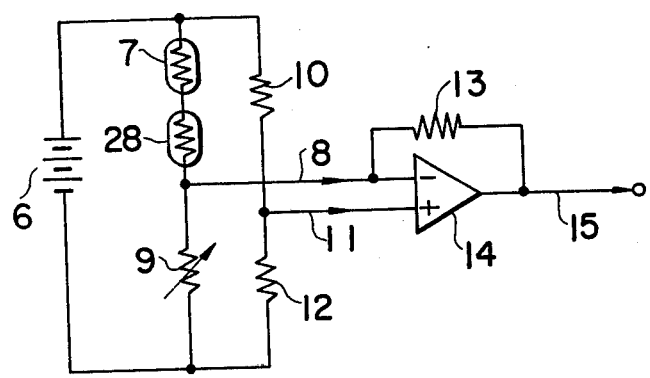
FIGS. 9 and 10 are circuit and characteristic diagrams, respectively, showing yet another embodiment of a portion of the control system according to this invention.

FIG. 9 shows a further embodiment of the temperature setter according to the present invention. By means of experiments, it has been verified that occupants feel cold when the relative humidity is low and that they feel hot when the relative humidity is high, in spite of a constant room air temperature. Thus, the set temperature must be determined in response to the relative humidity. The embodiment of FIG. 9 compensates for the variation of the mean skin temperature by means of the relative humidity.

Figure 10:
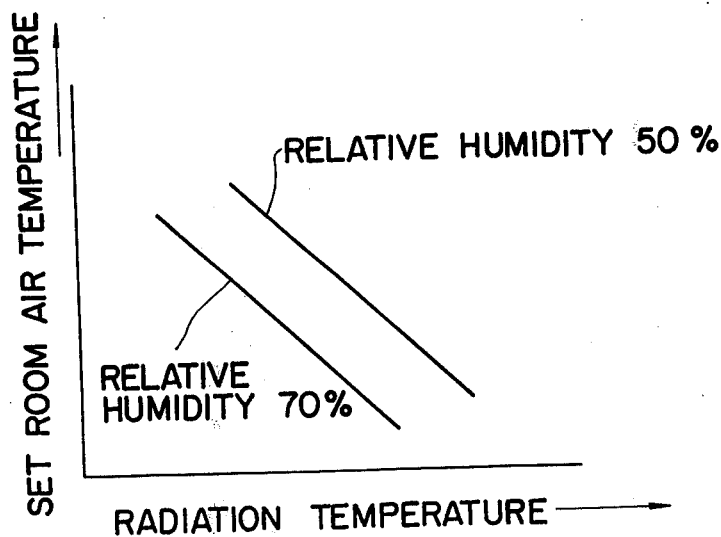

In FIG. 9, a relative humidity detector 28, the resistance of which varies in response to the relative humidity, is connected in series with the thermistor 7 of the circuit shown in FIG. 3. In such a construction, since the resistance of the relative humidity detector 28 is reduced with an increase in the relative humidity, the voltage on signal line 15 represents a low set temperature by increasing the voltage on signal line 8. FIG. 10 shows characteristic curves obtained from the circuit of FIG. 9, in which sample relative humidity values of 50% and 70% are indicated. In FIG. 9, it is possible to substitute a fixed resistor for the variable resistor 9 and to substitute a variable resistor for the fixed resistor 10 or 12.

According to the above-described arrangements for controlling the room air temperature, it is possible to always provide a condition of thermal comfort and to remarkably reduce the power consumption, since the set temperature is changed in inverse proportion to the radiation temperature.

The following description is directed to arrangements for controlling the air flow velocity and the relative humidity as parameters.

Figure 11:
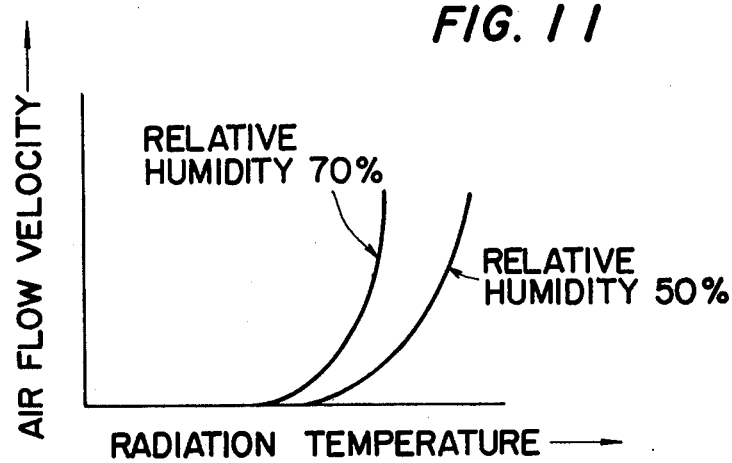
FIG. 11 is a characteristic diagram showing the relation between the radiation temperature and the air flow velocity used to provide a condition of thermal comfort.

By means of experiment, it has been verified that it is desirable to change the air flow velocity as shown in FIG. 11 so that occupants always feel comfortable in spite of variation of the radiation temperature. As seen from FIG. 11, the effect of the air flow velocity is apparent when the radiation temperature becomes greater than a predetermined temperature (for example, 25° C.), and it is remarkably apparent when the air flow velocity is low (for example, less than 3 m/S).

Figure 12:
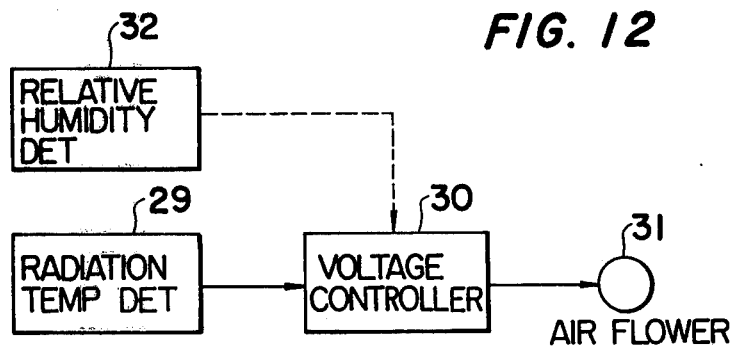
FIG. 12 is a block diagram showing another embodiment of a control system according to the invention.

FIG. 12 shows another embodiment of a control system according to the present invention, in which the air flow velocity is controlled in response to the radiation temperature as shown in FIG. 11. In FIG. 12, 29 represents a radiation temperature detector, 30 represents a voltage controller, 31 represents an air blower and 32 represents a relative humidity detector. The voltage controller 30 is controlled in response to the radiation temperature as measured by the detector 29. The rotating speed of the air blower 31 is controlled by the output voltage of the voltage controller 30 which serves for changing the air flow velocity. It is possible to control the voltage controller 30 in response to the relative humidity as measured by the relative humidity detector 32 providing an output to controller 30 as shown by dotted line in FIG. 12. It is seen from FIG. 11 that the influence of the radiation temperature can be cancelled by control of the relative humidity since the influence of the relative humidity is comparable to the influence of the radiation temperature.

Figure 13:
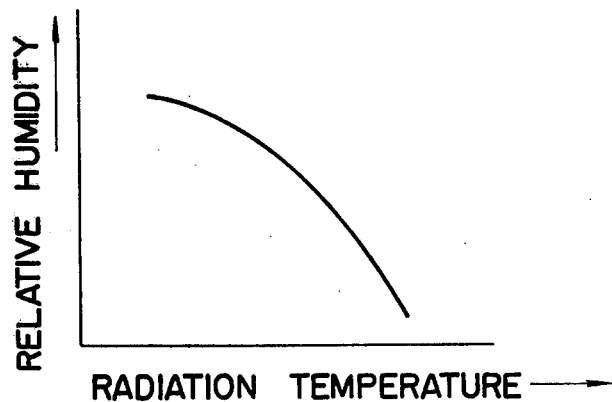
FIG. 13 is a characteristic diagram showing the relation between the radiation temperature and the relative humidity used to provide a condition of thermal comfort.
Figure 14:
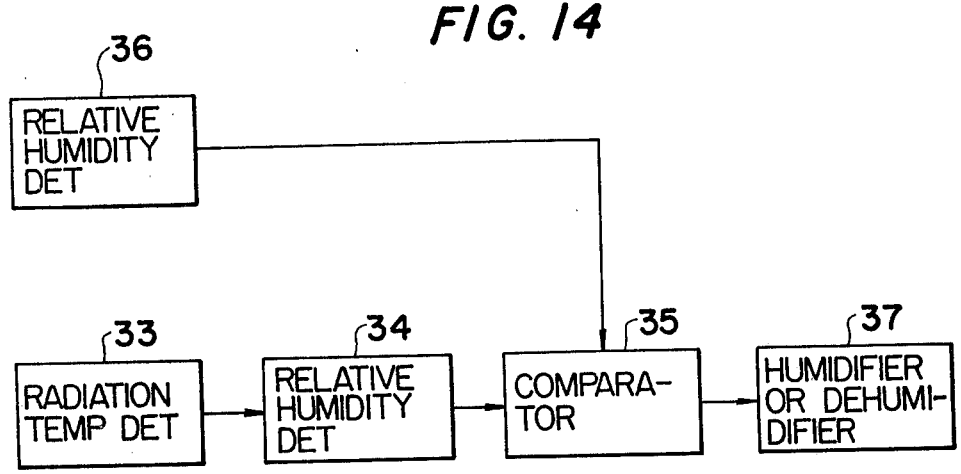
FIG. 14 is a block diagram showing yet another embodiment of a control system according to the present invention.

FIG. 13 shows the relation between the radiation temperature and the relative humidity. FIG. 14 shows another embodiment of the control system according to the invention, in which the relative humidity is controlled in response to the radiation temperature. In FIG 14, 33 represents a radiation temperature detector, 34 represents a relative-humidity setter, 35 represents a comparator, 36 represents a relative humidity detector and 37 represents a humidifier or a dehumidifier.

In the relative humidity setter 34, a relative humidity setting is determined in response to the radiation temperature as measured by the detector 33. In the comparator 35, the set relative humidity is compared with the actual relative humidity as measured by the detector 36, thereby obtaining a difference signal therebetween. The humidifier or dehumidifier 37 is controlled by the difference signal from comparator 35.

In the control systems of FIGS. 12 and 14, the room air temperature is controlled in the manner shown in FIG. 2, even through the construction for such control is not shown in these figures.

Figure 15:
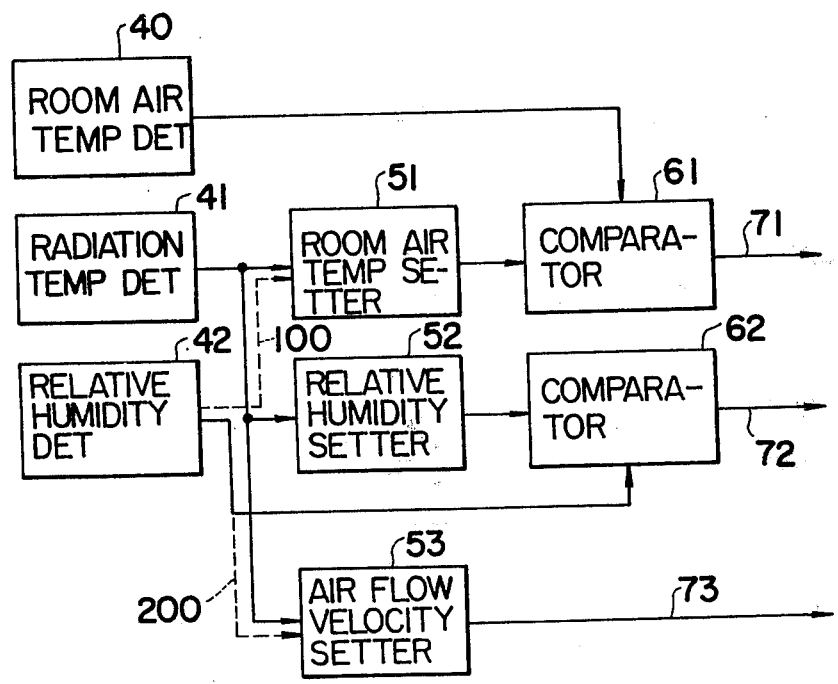
FIG. 15 is a block diagram of a further embodiment of a control system according to the present invention.

FIG. 15 shows yet another embodiment of the control system according to the invention, in which the room air temperature, the relative humidity and the air flow velocity are controlled at the same time in response to the radiation temperature. In FIG. 15, 40 represents a room air temperature detector, 41 is a radiation temperature detector, 42 is a relative humidity detector, 51 is a room air temperature setter, 52 is a relative humidity setter, 53 is an air flow velocity setter, 61 and 62 represent comparators, and 71, 72 and 73, represent signal lines.

Using the setters 51, 52 and 53, the room air temperature, the relative humidity and the air flow velocity are set in response to the radiation temperature as measured by the radiation temperature detector 41. In comparator 61, the set temperature is compared with the actual room air temperature as measured by the room temperature detector 40, thereby obtaining a difference signal therebetween. In comparator 62, the set relative humidity is compared with actual relative humidity as measured by the relative humidity detector 42, thereby obtaining a difference signal therebetween. The outputs of the comparators 61 and 62 and setter 53 are applied to the signal lines 71, 72 and 73, respectively. By means of the voltages on the signal lines 71, 72 and 73, a compressor motor, a humidifier or a dehumidifier and an air blower are controlled, respectively so as to provide the desired control.

It is also possible to determine the set temperature in response to the radiation temperature as well as in response to the relative humidity from detector 42 as shown by dotted line 100. Furthermore, it is possible to determine the set air flow velocity in response to the radiation temperature as well as in response to the relative humidity from detector 42 as shown by dotted line 200. Moreover, the set temperature, the set relative humidity and/or the set air flow velocity can be determined by the radiation temperature, the actual relative humidity and/or the actual air flow velocity.

The control system according to the present invention can also be applied to a system for controlling parameters in a defined space such as a stadium.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A system for controlling an air conditioner comprising first means for detecting the radiation temperature in a controlled space and providing an output indicative thereof, second means for setting a desired air parameter value in response at least to the output of said first means corresponding to the detected radiation temperature and providing an output indicative of the set air parameter, and a third means for controlling said air conditioner in accordance with the set air parameter from said second means, and further comprising fourth means for detecting the actual air parameter in the controlled space and providing an output indicative thereof, and fifth means for comparing the set air parameter from said second means with the actual air parameter from said fourth means and providing an output signal to the difference therebetween, said third means being responsive to the difference signal from said fifth means for controlling said air conditioner in accordance therewith.

2. A system according to claim 1 wherein air temperature is the air parameter set by said second means and detected by said fourth means.

3. A system according to claim 1, wherein the controlled space is a room.

4. A system according to claim 1, wherein said second means further includes bridge circuit means having said first means arranged therein, means for supplying voltage to said bridge circuit means, and means for differentially amplifying outputs of said bridge circuit means.

5. A system according to claim 1, further comprising sixth means for detecting the actual relative humidity in the controlled space and for providing an output indicative thereof, said second means being responsive to the output of said first means corresponding to the detected radiation temperature and to the output of said sixth means corresponding to the relative humidity for setting the desired air parameter in accordance therewith, said second means providing the set desired air parameter to said fifth means.

6. A system according to claim 5, wherein air temperature is the air parameter set by said second means.

7. A system according to claim 1, further comprising sixth means for setting a desired air flow velocity in response to the detected radiation temperature from said first means, and seventh means for controlling said air conditioner in accordance with the set air flow velocity from said sixth means.

8. A system according to claim 1, further including sixth means for detecting the actual relative humidity in the controlled space and providing an output indicative thereof, seventh means for setting a desired relative humidity in response to the output of said first means, eight means for comparing the set relative humidity from said seventh means with the actual relative humidity from said sixth means and providing an output signal of the difference therebetween, and ninth means for controlling said air conditioner in accordance with the difference signal output from said eighth means.

9. A system according to claim 8, further comprising tenth means for setting a desired air flow velocity in response to the output of said first means, and eleventh means for controlling said air conditioner in accordance with the set air flow velocity from said tenth means.

10. A system according to claim 4, wherein said second means further includes means for limiting the lower value of the output of said amplifying means to a predetermined value.

11. A system for controlling an air conditioner comprising first means for detecting the radiation temperature in a controlled space and providing an output indicative thereof, second means for setting a desired air parameter value in response at least to the output of said first means corresponding to the detected radiation temperature and providing an output indicative of the set air parameter, and a third means for controlling said air conditioner in accordance with the set air parameter from said second means, and said first means including at least one thermistor for detecting the radiation temperature, and said second means including a power source having one terminal connected to one terminal of said thermistor, a first resistor connected to one terminal of said thermistor, a first resistor connected between the other terminal of said thermistor and the other terminal of said power source, a second resistor having one terminal coupled to the one terminal of said power source, a third resistor coupled between the other terminal of said second resistor and the other terminal of said power source, a differential amplifier having first and second input terminals connected respectively to a connection point between said thermistor and said first resistor and to a connection point between said second and third resistors, and a fourth resistor connected between the output terminal and the first input terminal of said differential amplifier.

12. A system according to claim 11, wherein said first resistor is a variable resistor.

13. A system according to claim 11, wherein said second means further includes a fifth resistor having one terminal coupled to the one terminal of said power source, a sixth resistor coupled between the other terminal of said fifth resistor and the other terminal of said power source, and a diode connected between the other terminal of said fifth resistor and the output terminal of said differential amplifier.

14. A system according to claim 13, wherein said first and sixth resistors are variable resistors.

15. A system according to claim 10, wherein said second means further includes means for limiting the upper value of the output of said amplifying means to a predetermined value.

16. A system according to claim 11, wherein air temperature is the air parameter set by said second means.

* * * * *